ic, storage stable, spreadable, and self-leveling by dissolving in the resin minor amounts of cellulose acetate butyrate or related mixed esters of cellulose. After hardening, the composition is easily sanded to the desired contour; paint applied thereover forms a smooth coat, which, surprisingly, is free of pockmarks.

United States Patent [19]
Pechacek et al.

[11] 3,873,475
[45] Mar. 25, 1975

[54] COMPOSITION FOR FILLING, PATCHING AND THE LIKE

[75] Inventors: Alvin E. Pechacek, Mascoutah, Ill.; Eugene L. Baratto, White Bear, Minn.

[73] Assignee: Minnesota Mining and Manufacturing Company, St. Paul, Minn.

[22] Filed: June 13, 1973

[21] Appl. No.: 369,735

Related U.S. Application Data

[63] Continuation-in-part of Ser. No. 177,147, Sept. 1, 1971, abandoned.

[52] U.S. Cl.............. 260/2.5 B, 260/2.5 N, 260/16, 260/40 R, 260/842, 260/850, 260/862, 117/2
[51] Int. Cl............................................. C08g 53/08
[58] Field of Search ....................... 260/2.5 N, 2.5 B

[56] References Cited
UNITED STATES PATENTS

| | | | |
|---|---|---|---|
| 2,797,201 | 6/1957 | Ueatch et al................ | 260/2.5 B |
| 3,227,665 | 1/1966 | Fourcade et al................. | 260/2.5 N |
| 3,230,184 | 1/1966 | Alford.............................. | 260/2.5 N |
| 3,232,893 | 2/1966 | Salgado et al. .................. | 260/2.5 N |
| 3,260,688 | 7/1966 | Watanabe et al................. | 260/2.5 N |
| 3,574,646 | 4/1971 | Wismer et al..................... | 260/2.5 N |

*Primary Examiner*—Morton Foelak
*Attorney, Agent, or Firm*—Alexander, Sell, Steldt & DeLaHunt

[57] ABSTRACT

Light weight patching, caulking or sealing composition which is especially useful for filling dents in automobile bodies. A conventional liquid thermosetting polyester resin, generally containing solid particulate inorganic filler, is additionally filled with small hollow filler particles. The composition is rendered thixotropic, storage stable, spreadable, and self-leveling by dissolving in the resin minor amounts of cellulose acetate butyrate or related mixed esters of cellulose. After hardening, the composition is easily sanded to the desired contour; paint applied thereover forms a smooth coat, which, surprisingly, is free of pockmarks.

4 Claims, No Drawings

COMPOSITION FOR FILLING, PATCHING AND THE LIKE

CROSS-REFERENCE TO RELATED APPLICATION

This application is a continuation-in-part of copending application Ser. No. 177,147, filed Sept. 1, 1971 and now abandoned.

BACKGROUND OF THE INVENTION

This invention relates to compositions which are useful in repairing damaged auto bodies or in similar applications which involve patching, filling, caulking, sealing, etc.

For many years, conventional thermosetting polyester resin systems, containing solid particulate fillers, have been widely used in auto body filling and patching compositions. Such compositions have been characterized by rapid curing, low toxicity, good adhesion to steel, and other desirable physical properties. unfortunately, however, these advantages have been offset by certain disadvantages. For example, the compositions are somewhat difficult to spread, leaving an irregular surface which remains rough throughout the curing process. Another drawback of the prior art materials is the difficulty involved in sanding the cured composition. The incorporation of solid fillers (e.g., talc) makes the cured composition easier to abrade, but it also greatly increases specific gravity, typically to about 1.7 (14 lbs/gal) or more. Still another problem encountered with even the best prior art auto body filler compositions is the phenomenon known as "pinholing" or "pockmarking", in which tiny but readily visible holes or defects mar the exposed surface of the hardened filler composition and impart an unattractive appearance to subsequently applied paint, lacquer, or enamel.

Tiny hollow filler particles, such as glass, or synthetic resin microspheres or microbubbles have been incorporated in a wide variety of polyester molding compositions; see, e.g.m. U.S. Pats. No. 2,806,509 and 3,230,184. To the best of applicants' knowledge and belief, however, microspheres were never incorporated in auto body filler compositions prior to the present invention, presumably because it was recognized that sanding the surface of such a product would cut through the bubbles and thus, it was logically believed, result in a surface so covered with countless hemispherical depressions that the subsequently applied paint would follow the pockmarked contours of the surface.

SUMMARY OF THE INVENTION

The present invention provides a novel composition having unique and valuable properties for filling dents in automobile bodies. The composition not only can be easily and smoothly spread with a spatula, plastic blade, knife or similar tool but it also thereafter levels itself to present an even more regular exposed surface. The composition is light in weight, can be stored for extended periods of time without separation, and after hardening is easier to sand than conventional auto body fillers. Surprisingly, too, the sanded surface displays no visible pin holes or pockmarks, even after painting.

The invention is essentially an unobvious modification of the conventional solid particle-filled thermosettable polyester auto body filling and patching composition. Incorporated in the novel composition, however, is at least 20 volume percent hollow filler particles having a numerical average diameter of less than 150 microns, substantially all of the particles having a diameter of less than 200 microns, the total amount of filler particles constituting about ½-⅔ the total volume of the composition. In addition, the resin system, which correspondingly constitutes about ½-⅓ the total volume of the composition, includes, (based on resin system solids from about ¼ to about 10% by weight of a mixed ester of cellulose which is soluble in the polyester resin. The true overall density (i.e., the density of the composition after all entrained air is removed) is on the order of 0.4 – 1.2 grams per cubic centimeter (about 3.5 – 10 lbs/gal).

Compositions of the invention may be characterized as thixotropic, i.e., by a tendency to be normally stiff when at rest but to become fluid when subjected to mechanical agitation. Generally speaking, these compositions have a peak viscosity, when measured with a Brookfield viscometer using a No. 7 spindle rotating at 10 rpm, of at least 25,000 cps. The normally viscous nature of the quiescent composition greatly retards any tendency of the solid components to separate from the liquid components upon standing; thus, a workman who wishes to use only a portion of a large container of the composition can normally obtain a representative sample without first stirring up the entire contents.

Compositions of this invention are normally used by blending or kneading them with an initiator (e.g., a peroxide) at room temperature just prior to use. Since the polyester resin in such compositions ordinarily already contains a metal salt drier or a conventional accelerator such as a tertiary amine, rapid and cmplete cures take place at room temperature, generally within a few minutes. Typically the compositions gel in 6–7 minutes and fully cure in 12–15 minutes.

The thermosettable polyesters, co-monomers, accelerators, and initiators preferred for use in this invention are well known and are generally described in U.S. Pat. No. 3,328,231. The polyesters are characterized by a large number of repeating units of the formula

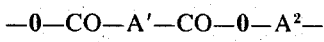

and preferably at least some units of the formula

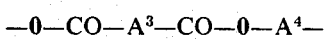

wherein A' is the residue of a diacid of the formula A' $(COOH)_2$ containing at least one carbon-to-carbon double bond, e.g., fumaric and/or maleic acid or the like; $A^2$ and $A^4$ are the residue of glycols such as ethylene glycol, propylene glycol, diethylene glycol, and/or dipropylene glycol, or the like; and $A^3$ is the residue of a saturated diacid such as phthalic, adipic, and/or glutaric acid or the like. The condensation product of these diacids and glycols is usually formulated to be flexible after crosslinking with one of the following monomers or mixtures of monomers: an aromatic vinyl such as styrene (preferred), vinyl toluene, etc., acrylonitrile; an acrylate such as methylmethacrylate; diallyl phthalate, and the like. Preferably the monomer is a low volatility organic liquid which can dissolve the polyester, but it should not dissolve filler particles. Initiators such as dibenzoyl peroxide or methyl ethyl ketone peroxide in conjunction with tertiary amines and organo metallic accelerators can be used for "curing" at room temperature. Heat can, if desired, be used to accelerate the reaction; if heat alone is used, initiators such as dicumyl peroxide, azobisisobutyryl nitrile and the like are used in catalytic amounts without accelerators. The final cured polyester is preferably a flexible, infusible, hardened mass.

The hollow filler particles used in this invention are preferably glass microspheres or microbubbles, e.g., of the type disclosed in U.S. Pat. No. 3,365,315. The walls of these microbubbles are made by expanding solid glass particles at temperatures above 1,000°C. to form tiny hollow spheroids having an apparent density of 0.1 – 0.4. Other suitable glassy or inorganic microbubbles are made of sodium silicate (see, for example, U.S. Pat. No. 3,030,215) or heatexpanded natural minerals such as perlite, volcanic ash, vermiculite, etc., or fly ash "Cenospheres" having a density of about 0.6. Organic resin microspheres can also be used, e.g., those having walls comprising urea-formaldehyde having diameters ranging from 2-60 microns and a density of about 0.23 phenolic resin having a density of 0.2 – 0.35 g/cc, diameters ranging from 2-50 microns and averaging size 40 microns (e.g., those commercially available from Union Carbide under the trade designation phenolic "Microballons", polyvinylidene polymers and copolymers having a density of 0.03 and an average diameter of 25-28 microns (e.g., those commercially available from Dow Chemical Company under the trade designation "Saran" dry expanded resin-bubbles), and the like; see generally U.S. Pat. No. 2,797,201. To reduce density of the final composition, the average true particle density of the hollow filler particles should be less than 0.6 g/cc, and to achieve optimum appearance, the average diameter should not exceed about 200 microns, and preferably should not exceed 100 microns. To achieve satisfactory weight reduction, the hollow filler particle content should exceed 5%, and preferably exceeds 10% by weight, respectively by volume, generally respectively corresponding to about 20, and 35% by volume. To maintain a usefully spreadable consistency, the total filler content of the composition should not exceed about ⅔ the total volume of the composition.

The composition may be further improved, especially when the walls of the hollow particulate filler comprise glass, by incorporating an alkylene silane having the formula

$$R_x SiX_{(4-x)}$$

in which R is an unsaturated group, preferably an unsaturated hydrocarbon group, including dienyl, vinyl, chlorovinyl, bivinyl, allyl, methallyl, chlorallyl, and the like; X is a group which reacts with sand or moisture normally present at the surface of sand, preferably chlorine or bromine, although it may be oxyaryl, oxyalkyl, amino, etc.; and $x$ is a whole number from 1 to 3. Exemplary alkylene silane compounds include allyl triethoxy silane, diallyl diethoxy silane, triallyl ethoxy silane, methallyl trichloro silane, trichloro allyl chloro silane, allyl methyl diethoxy silane, diallyl methyl ethoxy silane, allyl trichloro silane, dimethallyl diethoxy silane, vinyl trichloro silane, trivinyl dichloro silane, trivinyl monochloro silane, vinyl triethoxy silane, methyl vinyl dichloro silane, and the like.

The mixed esters of cellulose, which are an important part of the compositions made in accordance with the invention, are preferably cellulose acetate propionate (CAP), cellulose acetate butyrate (CAB), or blends of the two; it is believed, however, that other mixed esters of cellulose which are soluble in polyester resin are capable of functioning in the same manner. Cellulose is basically a linear natural polymer which is composed of hundreds of identical anhydroglucose units forming a poly-beta-glucoside chain and having an average molecular weight of well over 100,000. Each anhydroglucose unit has three hydrozyl groups which are susceptible to reaction with acids or anhydrides. By reacting cellulose with certain acids and anhydrides, cellulose esters are created.

In considering the CAB mixed ester, three controllable variables affect the nature of the ultimate product, viz., the % butyryl content, the hydroxyl content (conveniently expressed as OH groups/4 anhydroglucose units), and the viscosity (which is directly related to molecular weight). Viscosity is commonly expressed in terms of seconds for a steel ball to drop through a tube containing a specified solution of the ester (see Formula A in ASTM Method D-871-54T, using the test described in ASTM Method D-1343-54T. All CAB and CAP mixed esters evaluated have been effective, smaller amounts of high viscosity esters being required than of low viscosity esters; for example, as little as ¾% of 20 second CAB may produce about the same effect as 3% of ½ second CAB. It has been found, however, that the exact effect obtained with a given mixed ester can not be predicted with accuracy. Generally speaking, ½ to 3% of ½ second CAB (based on total resin present) yields excellent results, although up to 10% of low viscosity mixed esters may be used.

The solid particulate inorganic filler which is incorporated in compositions of the present invention, as in prior art compositions, has an average particle size of less than 50 microns to facilitate blending. Further, to maintain a low specific gravity, the density of these fillers is preferably less than 4. The amount of this filler employed can be up to about 50% by weight of the total composition, but the desired low specific gravity is sacrificed at higher percentages. Inorganic silicates such as diatomaceous earth, talc, various clays, and other siliceous minerals are readily obtained, have densities well below 4, have some thixothropic properties and hence are generally preferred.

DESCRIPTION OF PRESENTLY PREFERRED EMBODIMENTS

Understanding of the invention will be facilitated by referring to the following illustrative but non-limiting examples, in which all parts are by weight unless otherwise noted.

EXAMPLE 1

Into a modified spiral arm low speed blender was introduced 58.7 parts 70:30 polyester:styrene solution containing an accelerator such as dimethyl aniline. A suitable polyester resin is formed by reacting 1 part maleic anhydride, 4 parts phthalic anhyride, 2 parts diethylene glycol, 2.5 parts triethylene glycol and 0.3 part gropylene glycol; a commercial product of this general type, having a viscosity of 450 cps as measured at 22°C. on a Brookfield Viscometer using a No. 3 spindle rotating at 10 rpm, is available from Reichhold Chemical Company under the trade designation "Polylite" 93-556. There was next added 1.8 parts ½ second CAB having 38% butyryl content and one hydroxyl group per 4 anhydroglucose units; a suitable CAB is available from Eastman Kodak Company under the trade designation "EAB-381". Blending was carried out at approximately 80°C. until a clear solution resulted. The solution was then cooled to 22°C., at which time viscosity was found to be 2180 cps. Next, 1.0 part rutile $TiO_2$ pigment was added and blending continued until a uniform dispersion was obtained; 23.0 parts talc having an average particle size of about 10 microns (commercially available from United Sierra under the trade designation C-400 "Fibrene") was then added and blending continued until the mixture was uniform in appearance and free of lumps. At this point 15.5 parts hollow glass bubbles, 90% falling in the diameter range of 20–130 microns, having a mean diameter of 90 microns, was added; bubbles of this type, commercially available from Minnesota Mining and Manufacturing Company under the trade designation "B25B", are based on a 40% silica glass which has been heat expanded so that the average particle density is 0.20–2.25 g/cc. After mixing to produce a uniform blend, a vacuum of 635 mm Hg was applied and mixing continued until a smooth, viscous composition, homogeneous in appearance and free of air bubbles, resulted. The composition had a specific gravity of 0.77, corresponding to 6.4 lbs/gal, and displayed a peak viscosity of 200,000 cps. The solid components showed little or no tendency to separate from the liquid component. Even after several months, the composition remained uniform throughout and a representative sample could be removed without prior mixing. The mass was easily spreadable at room temperature, did not tend to "follow" a spatula, was smooth and uniform, even at thin edges, and did not sag, even when applied to vertical surfaces. After curing, the exposed surface was far smoother and more regular in appearance than that obtained with the best commercially available prior art product, and after cure it could be easily sanded to conform to adjacent contours. No pockmarks or blemishes were visible in the sanded surface, and when primed and lacquered, the filled area blended in so as to be visually indistinguishable from the surrounding area.

EXAMPLES 2–5

The following examples are identical to Example 1 in composition and preparation except that (1) CAP was substituted for CAB and (2) various commercially available polyester resins, each having a viscosity of about 400 cps were employed. In each case the composition performed effectively as an auto body filler; the viscosity of the composition, however, was somewhat higher, as is noted in the table set forth below:

| Example | Polyester resin | Viscosity of resin + CAP, cps | Viscosity of composition, cps |
| --- | --- | --- | --- |
| 2 | "Polylite" 93-556, as in Example 1 | 2,400 | 302,000 |
| 3 | Cargill PE 314 | 3,200 | 348,000 |
| 4 | Koppers 1251-5 | 3,400 | 360,000 |
| 5 | Interplastics Corporation "Co-Rez" 1039-63 | 4,700 | 715,000 |

EXAMPLE 6–10

The following five examples were identical to Example 1 in composition except that, instead of ½ sec. CAB, varying amounts of a 20 second 38% butyryl CAB were employed. In all cases, the product performed satisfactorily, although, as noted, peak viscosity (and hence spreadability) were affected.

| Example | Weight percent 20-sec. CAB | Viscosity of resin + CAB, cps | Viscosity of composition, cps |
| --- | --- | --- | --- |
| 6 | 0.25 | 660 | 152,000 |
| 7 | 0.50 | 950 | 180,000 |
| 8 | 0.75 | 1,400 | 192,000 |
| 9 | 1.0 | 1,900 | 260,000 |
| 10 | 1.25 | 2,650 | 304,000 |

EXAMPLE 11

Example 1 was repeated, substituting "ASP 400", clay (available from Engelhard) for the talc. The composition had a viscosity of 394,000 cps and was very smooth.

EXAMPLE 12

Example 1 was repeated, replacing 0.5 part of the talc with fumed colloidal silica (commercially available from the Godfrey L. Cabot Company under the trade designation "Cab-O-Sil" M-5) and adding an additional 1.8 parts of styrene monomer. The composition had a peak viscosity of 286,000 cps at 25°C., and it spread very well.

EXAMPLE 13

Example 1 was repeated, substituting for the talc an equal weight of nephyline syenite and adding an additional 2% styrene monomer. The composition had a peak viscosity of 222,000 cps at 22°C. and was somewhat more flexible after curing than the composition of Example 1.

EXAMPLE 14

To 200 parts of the composition of Example 1 was added 0.3 part of an alkylene silane commercially available from Dow Corning under the trade designation Z-6031. The composition displayed essentially the same physical properties as those of Example 1, but it is believed that the adhesion to the glass bubbles was enhanced.

EXAMPLE 15

The components described in Example 1, except substituting less dense glass bubbles, were blended in the following amounts:

| Component | Parts by Weight |
| --- | --- |
| Polyester resin | 63.0 |
| ½-sec. CAB | 1.3 |
| $TiO_2$ pigment | 1.0 |
| Talc | 24.7 |
| Glass bubbles, density 0.14, mean diameter 90 microns | 10.0 |
| Styrene monomer | 1.3 |

Prior to applying vacuum, the peak viscosity of the composition was 224,000 cps and the apparent density was 0.52 (4.4 lbs/gal); after applying vacuum, the peak viscosity was found to be 400,000 cps and the density to be 0.68 (5.7 lbs/gal). At this point an additional 1.9 parts styrene monomer was added, reducing the viscosity to 258,000 and further increasing the density to 0.71 (5.9 lbs/gal). The composition was smooth spreading and very satisfactory.

EXAMPLE 16

Equal weights of the Example 1 composition and the Example 2 composition were blended. The peak viscosity of the resulting composition was 264,000 cps, and it performed equally as well as each of the component compositions.

EXAMPLES 17–21

The following examples illustrate the effect of using various amounts of a low viscosity (0.1-second) CAB. All compositions are the same as in Example 1 except for the type and quantity of CAB.

| Example | % CAB based on Resin System | Viscosity of Resin + CAB, cps | Viscosity of composition, cps | Remarks |
|---|---|---|---|---|
| 17 | 3 | 1,250 | 172,000 | Easily spreadable |
| 18 | 5 | 1,800 | 256,000 | do. |
| 19 | 7 | 5,400 | 740,000 | Spreadable with some difficulty |
| 20 | 9 | 11,500 | >1,000,000 | Too viscous to spread |
| 21 | 11 | 22,000 | — | do. |

It will be recognized that the foregoing examples are merely illustrative of the invention and that numerous variations can be made without departing from the principles taught. For exammple, the smaller the particle size of both the solid or the hollow filler particles, the more easily the composition can be tapered to a thin edge and the smoother the sanded surface of the cured composition. Solid filler particles are generally more easily obtainable in small sizes than are hollow filler particles, but it is probable that if sufficiently small hollow filler particles could be obtained, the solid filler particles may be minimized or eliminated. The higgher the percentage of hollow filler particles, the greater the ease of sanding the cured composition; in addition, increasing the percentage of hollow filler particles decreases the density of the composition and reduces shipping costs. Generally speaking, sufficient resin should be employed to bond the particles together and form a filled mass upon curing, but any excess resin serves no useful purpose.

It has been found that peak viscosity of the composition can not always be directly coorelated with spreadability. Nevertheless, a useful guideline is that compositions having peak viscosities in excess of one million cps are likely to spread poorly and should generally be avoided.

What is claimed is:

1. A cured, unfoamed composition which, prior to curing, had a density of 0.4 to 1.2, displayed a peak viscosity of at least 25,000 cps, possessed particular utility for use in filling dents in damaged auto bodies in preparation for repainting, and consisted essentially of:
   1. approximately ⅓ to ½ by volume of a liquid resin system consisting essentially of
      a. a major portion of thermosettable unsaturated polyester resin,
      b. a minor portion of liquid organic monomer which is a solvent for said polyester resin and reactive therewith, and
      c. ¼ to 10% by weight, based on the total weight of (a) + (b), of at least one mixed ester of cellulose which is soluble in said polyester resin and which is selected from the class consisting of cellulose acetate butyrate and cellulose acetate propionate,
   2. correspondingly approximately ⅔ to ½ by volume of a particulate filler system consisting essentially of, on a volume basis,
      a. a major portion of particles selected from the class consisting of inorganic and synthetic resinous hollow microspheres having an average density of 0.03 – 0.6 and a mean diameter of less than 150 microns, substantially all of said particles having a diameter below 200 microns, and
      b. a minor portion of solid particulate inorganic filler having an average particle size of less than 50 microns and a density of less than 4, and
   3. 0 to 1.0% by weight, based on the total composition, of an alkylene silane, said composition, prior to curing being smoothly spreadable, self-leveling, and after curing being readily abradable to provide a surface which does not display pockmarks or blemishes when subsequently painted.

2. The composition of claim 1 wherein the hollow filler particles are glass microspheres having an average density of 0.1 – 0.4, a calculated average diameter of no more than 100 microns, and constitute about 50% of the volume of said composition.

3. The composition of claim 2 wherein the mixed cellulose ester constitutes about ½–3% by weight of the resin system.

4. In a composition which, prior to curing, possessed utility for repairing dents in automobile bodies and consisted essentially of a cured, unfoamed foaming liquid thermosettable unsaturated polyester resin having distributed throughout solid inorganic filler particles having an average particle size of less than 50 microns, the improvement which consists essentially of incorporating is said composition prior to curing at least 20% by volume, based on the total composition, of filler particles selected from the class consisting of inorganic and synthetic resinous hollow microspheres having an average density of less than 0.6, the total of said filler particles constituting about ½ – ⅔ the volume of said composition; and further incorporating in said composition at least ¼%, based on resin system solids, of a mixed ester of cellulose which is soluble in said polyester resin system and which is selected from the class consisting of cellulose acetate butyrate and cellulose acetate propionate, whereby the uncured composition is rendered light weight, storage-stable, easily spreadable, self-leveling and, when cured, abradable to expose a surface which does not display pockmarks or blemishes when painted.

* * * * *

UNITED STATES PATENT OFFICE
CERTIFICATE OF CORRECTION

PATENT NO. : 3,873,475
DATED : March 25, 1975
INVENTOR(S) : Alvin E. Pechacek and Eugene L. Baratto It is certified that error appears in the above-identified patent and that said Letters Patent are hereby corrected as shown below:

Col. 1, line 19, "unfortu-" should be -- Unfortu- --
Col. 2, line 7, after "solids" insert -- ) --
      line 31, "cmplete" should be -- complete --
Col. 3, line 21, "Microballons" should be -- Microballoons --
      line 35, after "20" insert -- % --
Col. 4, line 56, "gropylene" should be -- propylene --
Col. 7, line 31, "exammple" should be -- example --
      line 40, "higgher" should be -- higher --
Col. 8, claim 4, line 37, after "a" insert -- cured unfoamed --
      line 39, delete "cured, unfoamed foaming" and insert -- nonfoaming --
      line 44, "is" should be -- in --; after "composition" and "curing" insert -- , --

Signed and sealed this 27th day of May 1975.

(SEAL)
Attest:

RUTH C. MASON
Attesting Officer

C. MARSHALL DANN
Commissioner of Patents
and Trademarks